(12) United States Patent
Saha et al.

(10) Patent No.: US 8,826,208 B1
(45) Date of Patent: Sep. 2, 2014

(54) COMPUTATIONAL THERMAL ANALYSIS DURING MICROCHIP DESIGN

(71) Applicant: International Business Machines Corporation, Armonk, NY (US)

(72) Inventors: Sourav Saha, Barrackpur (IN); Sridhar H. Rangarajan, Bangalore (IN); Sumantra Sarkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/851,333

(22) Filed: Mar. 27, 2013

(51) Int. Cl.
*G06F 17/50* (2006.01)

(52) U.S. Cl.
CPC ........ *G06F 17/5081* (2013.01); *G06F 17/5009* (2013.01); *G06F 2217/80* (2013.01); *G06F 2217/14* (2013.01); *G06F 2217/12* (2013.01)
USPC ............. 716/111; 716/136; 716/106; 716/51; 703/14

(58) Field of Classification Search
CPC ............ G06F 17/5081; G06F 17/5009; G06F 2217/80; G06F 2217/14; G06F 2217/12
USPC ...................... 716/111, 106, 136, 151; 703/14
See application file for complete search history.

(56) References Cited

U.S. PATENT DOCUMENTS

| 5,600,578 | A   | * | 2/1997  | Fang et al. ....................... 703/14 |
|-----------|-----|---|---------|----------------------------|
| 5,784,289 | A   |   | 7/1998  | Wang                       |
| 6,791,343 | B2  | * | 9/2004  | Ramarao et al. .............. 324/677 |
| 6,940,293 | B2  | * | 9/2005  | Ramarao et al. .............. 324/677 |
| 7,210,115 | B1  | * | 4/2007  | Rahim et al. .................. 716/113 |
| 7,299,442 | B2  |   | 11/2007 | Alpert et al.              |
| 7,428,720 | B2  | * | 9/2008  | Kanno et al. .................. 716/127 |
| 7,681,165 | B2  |   | 3/2010  | Peters et al.              |
| 7,714,610 | B2  | * | 5/2010  | He ................................. 326/41 |
| 7,823,102 | B2  |   | 10/2010 | Chandra et al.             |
| 7,827,510 | B1  | * | 11/2010 | Schubert et al. ............. 716/136 |
| 7,992,120 | B1  |   | 8/2011  | Wang et al.                |
| 8,082,137 | B2  |   | 12/2011 | Li et al.                  |
| 8,104,006 | B2  |   | 1/2012  | Kariat et al.              |
| 8,356,270 | B2  | * | 1/2013  | Burd et al. ..................... 716/136 |
| 8,595,671 | B2  | * | 11/2013 | He ................................ 716/116 |
| 2004/0100286 | A1 | * | 5/2004 | Ramarao et al. ............ 324/677 |
| 2005/0012509 | A1 | * | 1/2005 | Ramarao et al. ............ 324/677 |
| 2005/0251775 | A1 | * | 11/2005 | Wood .............................. 716/10 |
| 2006/0258132 | A1 | * | 11/2006 | Brown et al. ................. 438/610 |
| 2007/0164785 | A1 | * | 7/2007  | He ................................. 326/41 |
| 2007/0198971 | A1 | * | 8/2007  | Dasu et al. .................... 717/140 |

(Continued)

OTHER PUBLICATIONS

Alpert, Charles J. et al., "The Importance of Routing Congestion Analysis", DAC.COM Knowledge Center Article www.dac.com Design Automation Conference May 4, 2010 , 14 pages.

(Continued)

*Primary Examiner* — Phallaka Kik
(74) *Attorney, Agent, or Firm* — DeLizio Gilliam, PLLC

(57) ABSTRACT

Some embodiments include a method for identifying high-temperature regions in a microchip. In some embodiments, the method includes selecting grids on the microchip, wherein each grid includes devices and interconnects connecting the devices. The method can also include determining, for each grid, a temperature factor value based on geometric area of the grid, geometric area occupied by the devices, switching factor of the of the interconnects, and length of the interconnects connecting the devices. The method can also include determining, for each grid, thermal sensitivity for the grid by generating a plot based on a Guassian equation.

20 Claims, 8 Drawing Sheets

(56) References Cited

U.S. PATENT DOCUMENTS

| | | | |
|---|---|---|---|
| 2008/0195984 | A1 | 8/2008 | Dougherty et al. |
| 2009/0024969 | A1 | 1/2009 | Chandra |
| 2009/0132834 | A1 | 5/2009 | Chaudhry et al. |
| 2009/0278564 | A1* | 11/2009 | Dehon et al. ............. 326/9 |
| 2010/0231263 | A1* | 9/2010 | Fish et al. ............. 326/121 |
| 2010/0281448 | A1* | 11/2010 | He ............. 716/6 |
| 2012/0005639 | A1* | 1/2012 | Fish et al. ............. 716/104 |
| 2012/0019834 | A1* | 1/2012 | Bornhop ............. 356/517 |
| 2012/0096424 | A1* | 4/2012 | Burd et al. ............. 716/136 |

OTHER PUBLICATIONS

Disclosed Anonymously, ,"Congestion mitigation by Congestion Optimized Library Cell Swapping and Selective Standard Cell Repulsion", An IP.com Prior Art Database Technical Disclosure Aug. 30, 2012 , 10 pages.

Huang, Wei et al., "Compact Thermal Modeling for Temperature-Aware Design", (wh6p, mircea, sg7w)@virginia.edu, (skadron, karthik, sv7d)@cs.virginia.edu Apr. 2004 , pp. 1-17.

Krishnamoorthy, Srini et al., "Switching Constraint-driven Thermal and Reliability Analysis of Nanometer Designs", IEEE publication {srini.krishnamoorthy, vishak.venkatraman, yuri.apanovich, tom.burd, anand.daga}@amd.com 2011 , 8 pages.

Krishnan, Vyas , "Temperature and interconnect aware unified physical and high level synthesis", Graduate School Theses and Dissertations. 2008 , 232 pages.

Liu, Wei , "Power and Thermal Management of System-on-Chip", www.imm.dtu.dk 2011 , 152 pages.

Siozios, Kostas et al., "A Power-Aware Placement and Routing Algorithm Targeting 3D FPGAs", Journal of Low-Power Electronics (JOLPE), vol. 4, No. 3 Dec. 2008 , 36 pages.

Wei, Yaoguang et al., "GLARE: Global and Local Wiring Aware Routability Evaluation", 2012 , pp. 768-773.

* cited by examiner

COMPUTATIONAL THERMAL ANALYSIS DURING MICROCHIP DESIGN

BACKGROUND

In modern processor implementations, variations in process, voltage, and temperature (PVT) can cause malfunctions. PVT variations may become more pronounced as processors scale-up. On-die temperature variation is one of many PVT-related problems that can cause problems in processors, systems on a chip, application specific integrated circuits, etc. On-die temperature variation refers to a temperature gradient in different parts of a chip. In some instances, temperature variation leads to "hotspots" within a chip, where certain areas exhibit significantly higher temperatures than nearby areas. In some instances, hotspots may result from clustering high-activity networks and connected devices in certain areas. Under many workloads, the clustered high-activity networks may cause hotspots on the chip. These hotspots can negatively affect chip performance, such as by causing EM/IR issues, NBTI/PBTI issues, additional leakage power dissipation (e.g., leakage power may almost double with every 10 C rise in temperature).

In modern sign-off processes, designers typically focus on timing, power sign-off, and some reliability issues. However, thermal issues may be left largely unaddressed.

BRIEF DESCRIPTION OF THE DRAWINGS

The present embodiments may be better understood, and numerous objects, features, and advantages made apparent to those skilled in the art by referencing the accompanying drawings.

In FIG. 2, the textured rectangles are standard cells placed in different circuit rows (grids where standard cells are legalized and placed).

DESCRIPTION OF EMBODIMENT(S)

The description that follows includes exemplary systems, methods, techniques, instruction sequences and computer program products that embody techniques of the present inventive subject matter. However, some embodiments may be practiced without these specific details. In other instances, well-known instruction instances, protocols, structures and techniques have not been shown in detail to clarify this description.

Introduction

Some embodiments of the inventive subject matter enable chip designers to locate thermal hotspots on a chip using arithmetic techniques. Therefore, embodiments avoid using complex computations involved in thermal equations, such as Maxwell's relations. Because embodiments avoid complex thermal equations, they allow chip designers to more quickly reconfigure chip designs to avoid hotspots.

Some embodiments determine a temperature variable ($\Delta T$) for a grid (i.e., a chip area) based on length of network connections between devices in the grid, network switching factors between devices in the grid, and the geometric area of the grid. Some embodiments use $\Delta T$ as a parameter into a derivative function from the standard Gaussian/Normal distribution function, where $\Delta T$ can be used to control height and width of the derivative function. Using the derivative function, embodiments can identify grids that exhibit unacceptably high temperatures. After identifying high temperature grids, embodiments can reconfigure networks in those grids to avoid high switching factors and other conditions that cause unacceptably high temperatures.

Discussion of Embodiments

This section will provide additional details about how some embodiments identify hotspots on a microchip. FIGS. 1-6 will be discussed.

Figure 1:
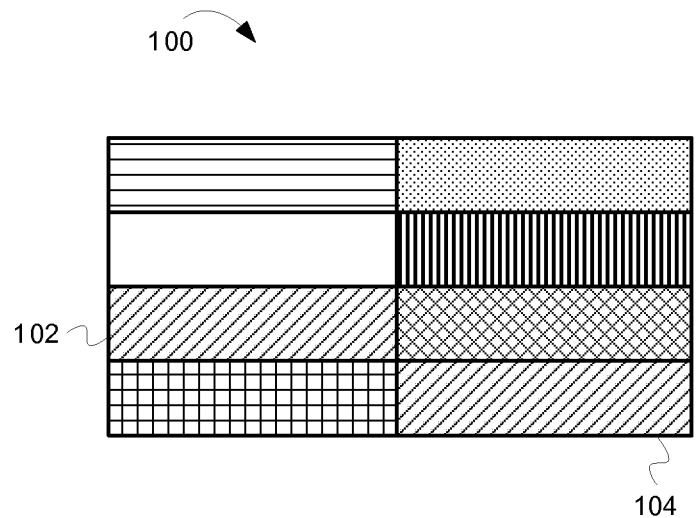
FIG. 1 shows a power map of a chip grid.

FIG. 1 shows a power map of a chip grid. In FIG. 1, each texture represents a different dynamic power and leakage number (e.g., each texture represents a range between 0 and max power). Irrespective of whether the analysis is done at small or large complex chip building block level, total leakage and dynamic power number of the design unit can be first analyzed at a grid level (e.g., as shown in FIG. 1). Some embodiments employ a threshold based scheme to isolate a subset of the chip design, where dynamic and leakage numbers are above a specific lower threshold, or based on ratio of leakage and dynamic number in a grid. Very small localized hotspots can be formed even within a low power dissipation region, depending on relative clustering of high activity networks. However, embodiments can selectively focus on fewer zones, such a sin cases of very big designs. Embodiments can also select design subsets based on slack bins, where netlists will not be optimized for highly timing critical elements.

Figure 2:
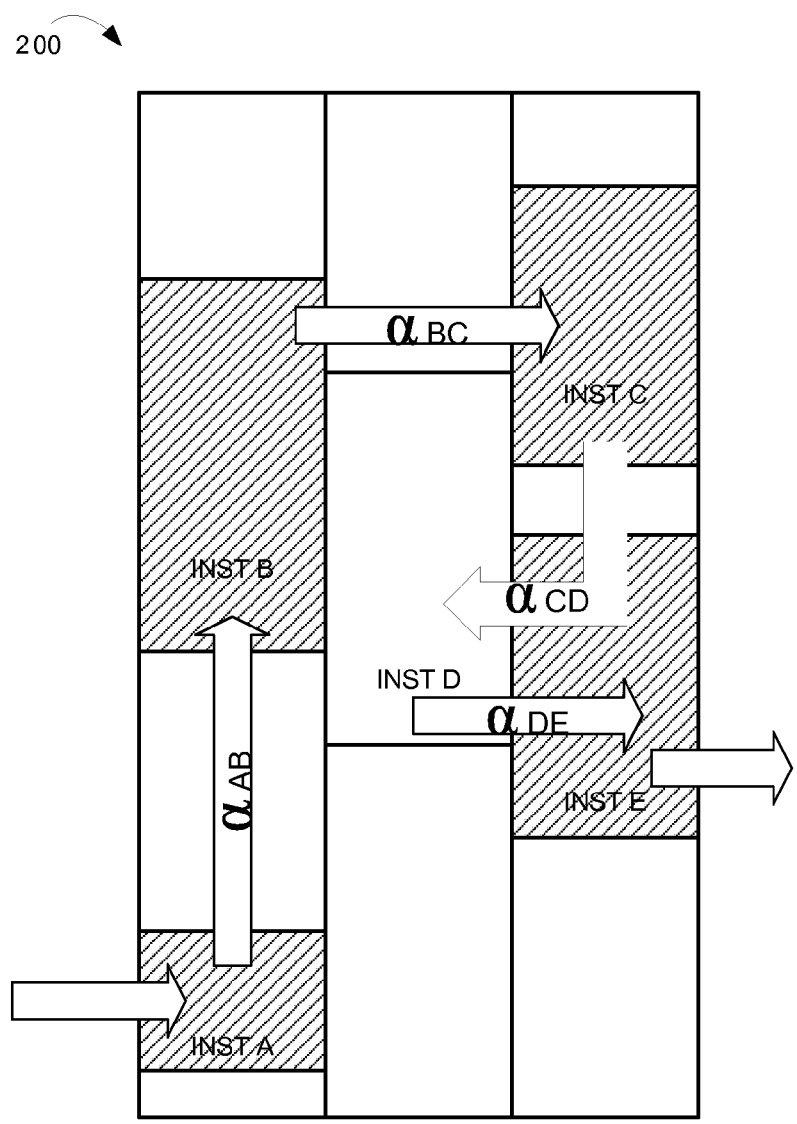
FIG. 2 shows a cells in a grid.

FIG. 2 shows cells in a grid of a microchip. In FIG. 2, the textured rectangles are standard cells placed in different circuit rows (grids where standard cells are legalized and placed). Connectivity wiring resides between the cells, and appears in FIG. 2 as arrows. The arrows are labeled with switching activity. For example, $\alpha_{AB}$ represents switching activity on the network between cell A and cell B. Switching activity of all networks in a design can be determined by a standard power estimation engine (e.g., Einspower etc.), which has an in built BDD (binary decision diagram) propagation engine that computes all internal network switching activity from the boundary switching activity information. Based on these switching activity numbers, embodiments can compute temperature swing of a grid on a first order basis as follows. For a point-to-point network between two cells (e.g., A and B), thermal sensitivity of the network with switching activity $\alpha$ is proportional to switching activity divided by an Area_wt function. See Equation (1) below. In some embodiments, equation (1) makes the following considerations:

Switching factor of a network can be modeled as a "source" of a thermal hotspot. The connected device is a primary sink point of associated heat energy (other devices in nearby vicinity are discarded in 1st order model).

More the width of connected devices through a particular network as a % of total grid area, less is the "peak" of thermal sensitivity function (visualize as thermal density—analogous to power density) $\alpha_{AB}$ More the spread of the devices within a zone, further lowering of peak of sensitivity function happens as effective sink is more.

The equations are as follows:

$$\Delta T_{Grid} \propto \sum \forall \, \text{inst} \frac{\alpha_{AB}}{\text{Area\_wt}(A, B)} \quad \text{(Equation 1)}$$

where $$\text{Area\_wt}(A,B) = [\{0.5*\{\text{Area}(A)+\text{Area}(B)\}\}*\text{Area}(\text{Grid})^{-1}]^{\beta a} * [k_d * \text{Distance}(A,B)]^{\beta d}$$

In some embodiments, the following apply to Equation 1: $\beta_d$ and $\beta_a$ represent index power numbers that help Equation 1 to model empirically calculated results within a reasonable degree of accuracy. In some embodiments, the empirically calculated results involve using Maxwell's equations to determine temperatures on the chip. Equation 1 uses $\beta_d$ and $\beta_a$ to achieve results that approximate the empirically calculated results. Some embodiments assign $\beta_d$ and $\beta_a$ values based on accuracy tolerances for a given chip. $K_d$ represents scaling coefficient for distance dependency for connected devices to the particular network.

For higher accuracy, some embodiments apply Maxwell's equations to larger data sets to compute more accurate values for $\beta_d$, $\beta_a$, and $K_d$. For some embodiments, $\beta_d$, $\beta_a$, and $K_d$ have values between 0.2 and 2. However, other embodiments may employ other values based on different accuracy tolerances.

Some embodiments assume 50% of total connected device area as sink for the heat contributed by particular network switching activity and normalizes the relative temperature contribution by dividing the total sink area by grid area.

Referring back to FIG. 2 and Equation 1, the value for ΔT in the grid 200 can be calculated as follows:

$$\text{Area\_wt}(A, B) \propto \left[ \frac{.5(\text{area }(A) + \text{area }(B))}{\text{area (grid)}} \right]^{\beta a} \times [K_d \times \text{distance }(AB)]^{\beta d}$$

$$\text{Area\_wt}(B, C) \propto \left[ \frac{.5(\text{area }(B) + \text{area }(C))}{\text{area (grid)}} \right]^{\beta a} \times [K_d \times \text{distance }(BC)]^{\beta d}$$

$$\text{Area\_wt}(C, D) \propto \left[ \frac{.5(\text{area }(C) + \text{area }(D))}{\text{area (grid)}} \right]^{\beta a} \times [K_d \times \text{distance }(CD)]^{\beta d}$$

$$\text{Area\_wt}(D, E) \propto \left[ \frac{.5(\text{area }(D) + \text{area }(E))}{\text{area (grid)}} \right]^{\beta a} \times [K_d \times \text{distance }(DE)]^{\beta d}$$

$$\Delta T\text{Grid} \propto \left[ \frac{\alpha_{AB}}{\text{Area\_wt}(AB)} + \frac{\alpha_{BC}}{\text{Area\_wt}(BC)} + \frac{\alpha_{CD}}{\text{Area\_wt}(CD)} + \frac{\alpha_{DE}}{\text{Area\_wt}(DE)} \right]$$

Equation 1 can be extended to multiple fan-out networks and also approximated for the networks which are falling within multiple grids etc. Furthermore, although FIG. 2 shows a grid having three columns a relatively small number of cells, the grids can be any suitable number of columns (e.g., 100 columns) and have any suitable number of cells.

After determining ΔT Grid, some embodiments create a bell-shaped plot (representing a network level temperature sensitivity function) to determine grid-level temperature on a chip. That is, some embodiments utilize a Gaussian/Normal distribution plot, where a scalar number from Equation 1 can be used as parameter to control height and width (2-D circular spread) of the Gaussian/Normal function. For example, some embodiments, use ΔT Grid as input for σ in the following Gaussian equation.

$$f(x) = \frac{1}{\sigma\sqrt{2\pi}} e^{\frac{-(x-\mu)^2}{(2\sigma^2)}}$$

Figure 3:
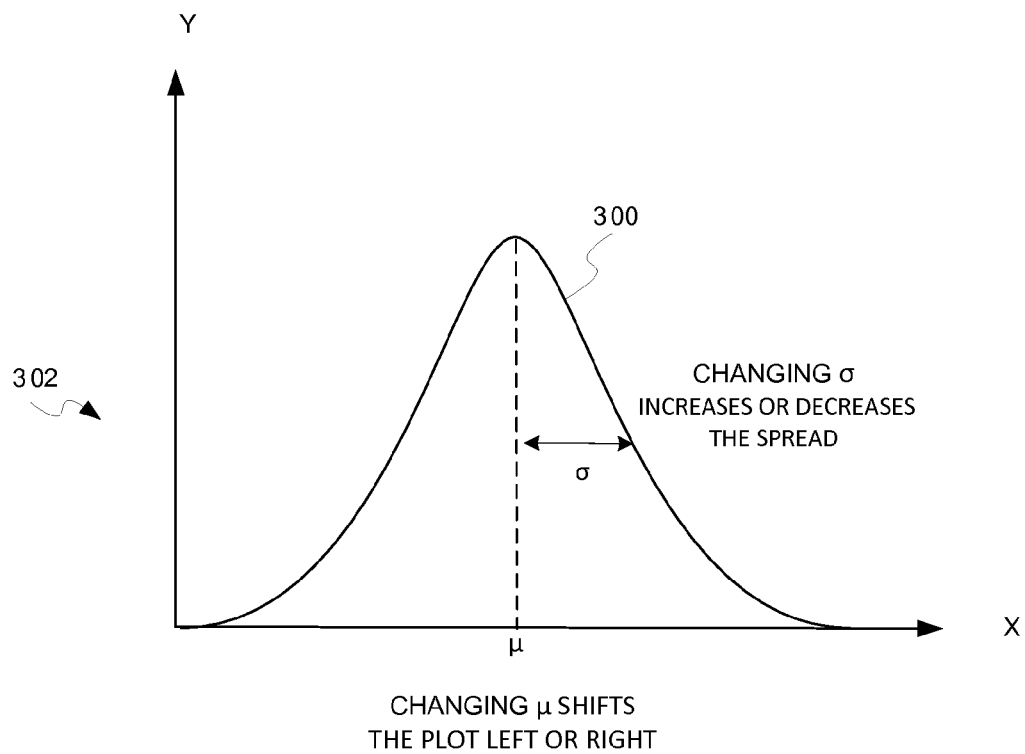
FIG. 3 shows a plot based on the Gaussian equation above.

FIG. 3 shows a plot based on the Gaussian equation above. In FIG. 3, Gaussian plot 300 appears on an X-Y axis 302. As shown, the value of μ affects where the plot 300 is centered along the X axis. The value of σ affects the spread of the plot 300. As noted above, some embodiments assign the value of ΔT Grid to σ, while holding μ constant, thereby affecting the spread and height of the plot. Therefore, some embodiments can determine thermal sensitivity plots for portions of the chip. Embodiments can specify bell curve heights and spreads that constitute unacceptably high temperatures. Therefore, embodiments can identify portions of the chip (e.g., grids, networks, etc.) that exhibit high temperatures.

Some embodiments can make the model more accurate. Some embodiments can associate a factor of (1/total number of networks connected) for each device instead of 50% device area assigned. This may be called an "effective area function." In some embodiments, the Area_wt function formulation for multiple fan-out networks can be more computationally intensive. The distance function can be computed using "centroid" of all connected devices and root-square-mean or average of distance of each device from centroid location. In some embodiments, the Area function may be computed by simply extending to all connected device multiplied by an "effective area fraction".

Figure 4:
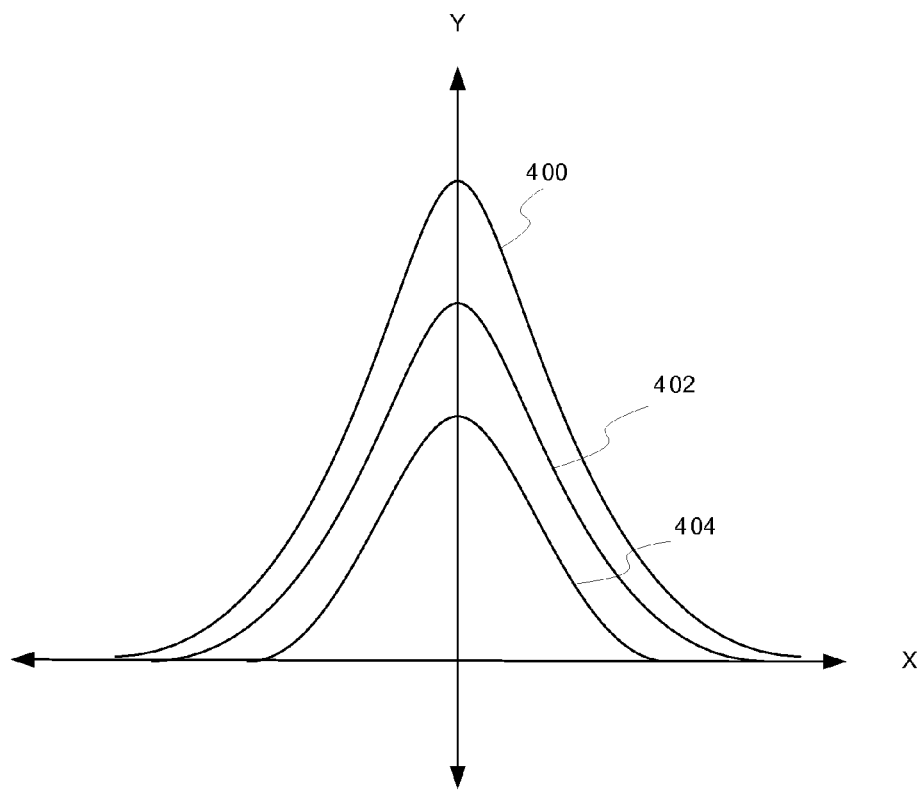
FIG. 4 shows a family of thermal sensitivity plots.
Figure 5:
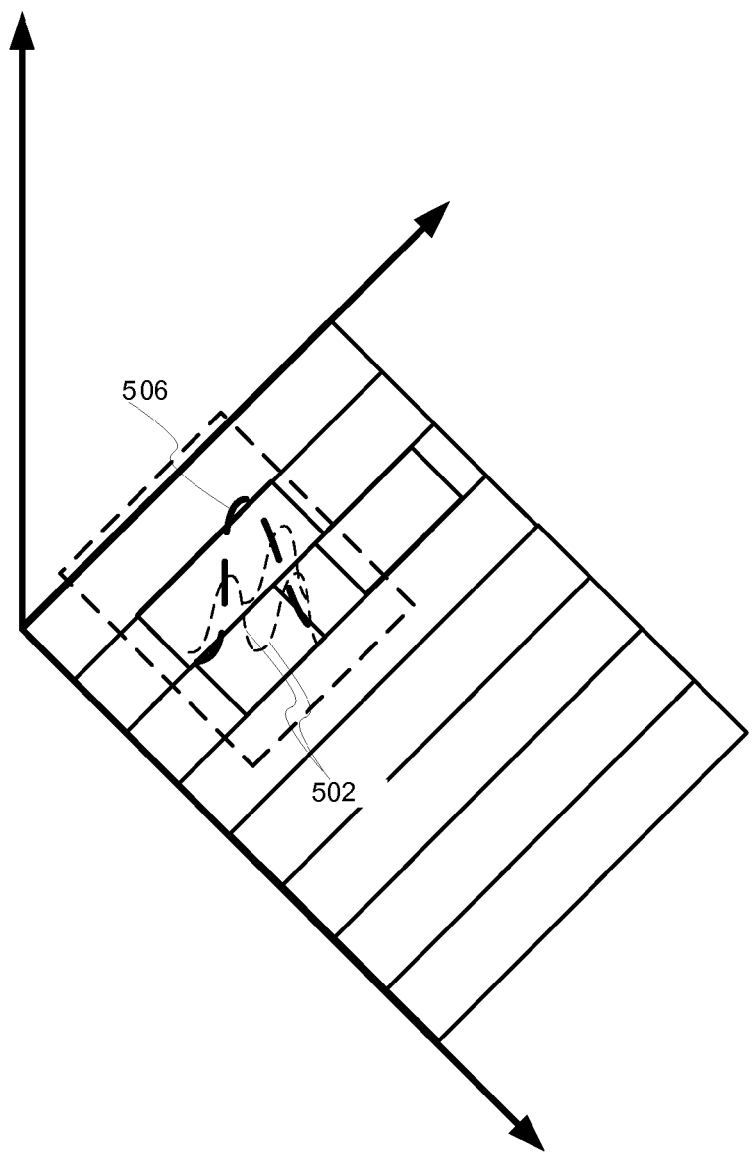
FIG. 5 shows how embodiments can determine combine thermal sensitivity plots for multiple regions.

Some embodiments determine a thermal sensitivity function at the grid level of the chip, or at other levels of granularity (e.g., network level). FIGS. 4 and 5 describe thermal modeling performed by some embodiments of the inventive subject matter. Some embodiments presume a bell-shaped curve model to reflect thermal intensity and spread originating from each switching activity marked network. That is, some embodiments can generate a thermal sensitivity plot for a particular network (i.e., a list of devices and interconnects—See FIG. 2). Some embodiments compute the grid level thermal sensitivity function from spatial correlation of a network based function. Some embodiments presume the vertical peak and horizontal spread radius are having identical dependency. Some embodiments generate a parameterized 3D bell shape function where height and radial spread of function have scaling number relation with ΔT grid. In some embodiments, the thermal sensitivity function is a 3D function. Because the 3D function models temperature on a chip, the 3D function's x and y values are identical. Therefore, in some instances, the 3D function can be plotted as a 2D function (e.g., a 2D bell curve in some embodiments).

Embodiments can determine thermal sensitivity at different chip granularities. For example, embodiments can determine thermal sensitivity at the interconnect level (i.e., two devices and one interconnect), network level (i.e., multiple devices and multiple interconnects), grid level (i.e, defined number of columns on the chip), etc. For each level of granularity, embodiments assume heat is emanating from the center of the region (e.g., center of a network). For example, although heat may be emanating all along a network's interconnects and devices, embodiments assume the heat is emanating from the center of network. Similarly, at the grid level, embodiments assume heat is emanating from the center of the grid. In the Guassian equation shown above, $\mu$ refers to the x, y coordinates from which heat is emanating. According to some embodiments, the x, y coordinates coincide with the center of the region (e.g., grid, network, interconnect, etc.) whose thermal sensitivity is being determined. Embodiments can determine thermal sensitivity of a larger region (e.g., a network) by adding thermal sensitivity plots for a plurality of smaller regions (e.g., interconnects).

FIG. 4 shows a family of thermal sensitivity plots. In FIG. 4, the thermal sensitivity plots 400, 402, and 404 coincide with three regions within a chip (e.g., networks). Because these plots are all centered on the Y axis, all three regions share a center from which heat emanates under the model. Embodiments can add the plots together by using Guassian addition. When adding plots, some embodiments use the following equations.

$$\sigma_z = \sqrt{\sigma_y^2 + \sigma_x^2}$$

and $$\mu_z = \mu_x + \mu_y$$

When combing plots for two or more regions that share a center, embodiments need not add the $\mu$ factors. Embodiments can determining $\sigma_z$ (i.e., combined value of the $\sigma$ terms), and generate a composite thermal sensitivity plot by using the Guassian Equations shown above. FIG. 5 shows how embodiments can determine combine thermal sensitivity plots for multiple regions. In FIG. 5, the thermal sensitivity plots 502 have been determined for three different regions. The plot 506 is the thermal sensitivity plot for all regions combined. In some instances, embodiments combine the $\sigma$ factors and/or combine the $\mu$ factors to create the plot for all regions combined.

Figure 6:
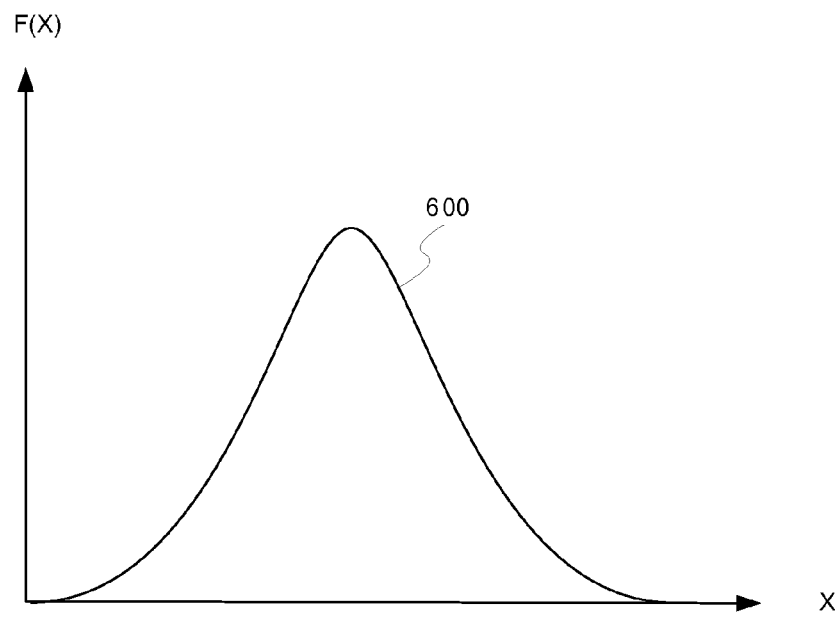
FIG. 6 shows an illustration of pre- and post-optimization thermal sensitivity function shape.
Figure 6:
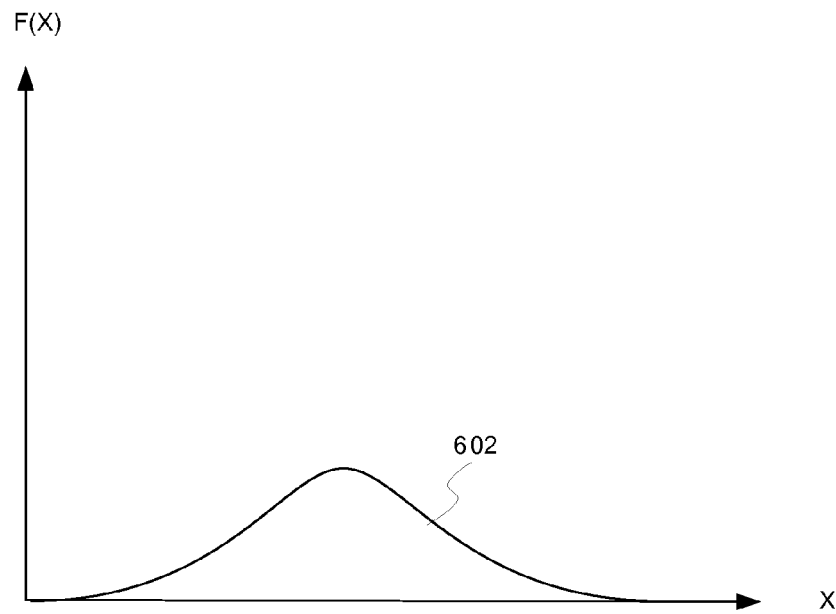

FIG. 6 shows an illustration of pre- and post-optimization thermal sensitivity plot shape. After determining grid level thermal sensitivity plots, some embodiments identify functions that are outside a range of acceptable values. For those functions exhibiting unacceptably high temperatures, some embodiments perform a netlist optimization process to spread the thermal hotspots and reduce the gradient in the affected zones. Such optimization reduces the activity of networks which are highly active. These networks can be determined by propagating the AFs (Activity Factors) from primary inputs either through functional propagation or through simulation. The AFs of input networks can be found out from the simulation data set. The propagation engine should have incremental capability and thus once the optimization changes the logic to reduce the AFs, it can quickly calculate the updated AFs of the affected networks and books. FIG. 6 shows a thermal sensitivity function plot for a grid that has undergone the netlist optimization process described above.

As shown in FIG. 6, the plot 600 was determined before any optimization. Plot 602 has less height, and therefore shows that the optimized region has lower temperature.

Figure 7:
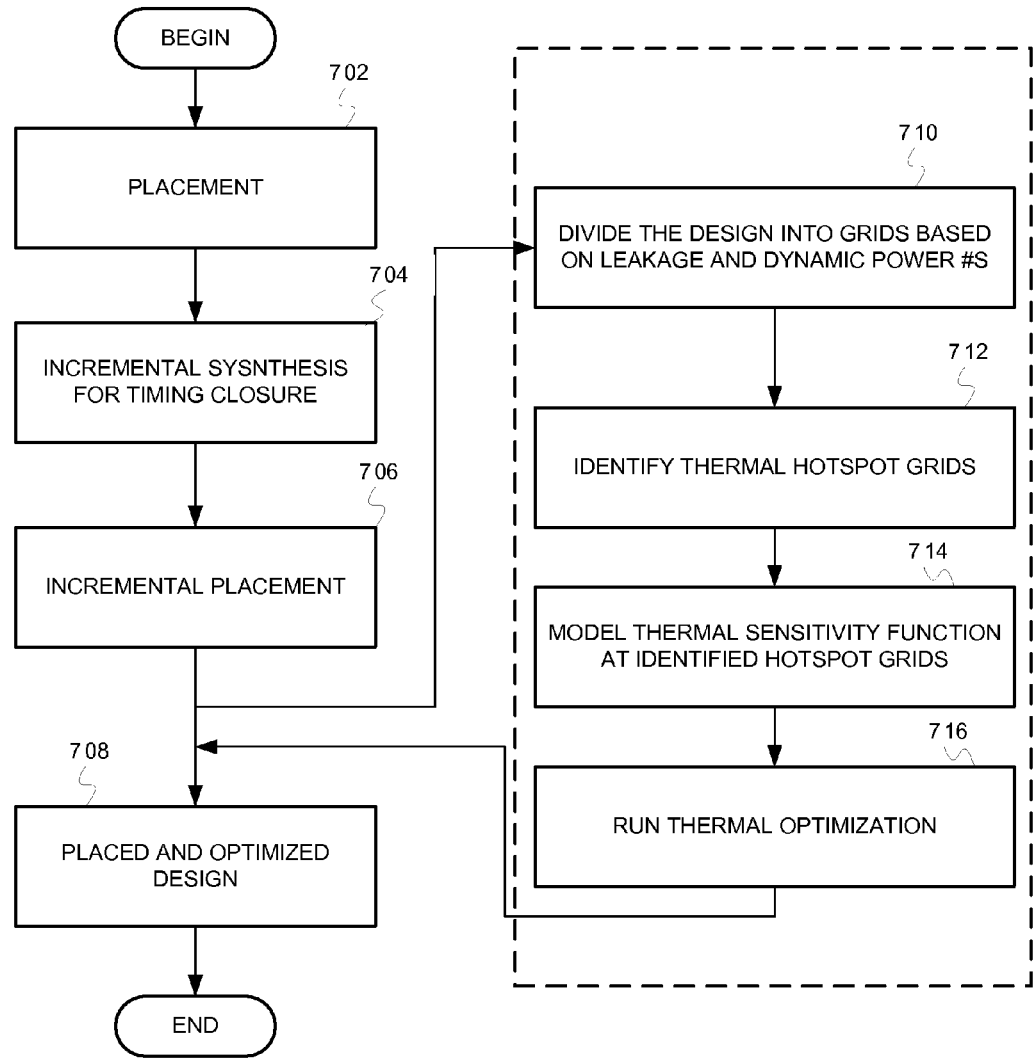
FIG. 7 shows a flow diagram illustrating operations for finding hotspots on a chip, according to some embodiments.

FIG. 7 shows a flow diagram illustrating operations for finding hotspots on a chip, according to some embodiments. The flow 700 shows how the operations for determining hotspots on a chip fit into a large process for designing a microchip. The left side of the flow 700 shows traditional design operations. After block 706, the flow can branch off and perform operations 710, 712, 714, and 716. At block 706, the flow divides a chip designed into grids and determines grid-based power leakage and dynamic power values (e.g., see FIG. 1). The flow continues at block 712. At block 712, the flow identifies thermal hotspot grids. For example, embodiments can divide a chip into grids (e.g., see FIG. 2). The flow continues at block 714, where embodiments determine thermal sensitivity functions at the identified hotspot grids. For each grid, embodiments use determine the grid's $\Delta T$ Grid value. Embodiments can determine thermal sensitivity for the grid by assigning the grid's $\Delta T$ Grid value to $\sigma$ in the Guassian equation, thereby generating a thermal sensitivity plot for the grid. At block 716, for grids exhibiting unacceptably high temperatures, embodiments reconfigure interconnects and devices in the grids to reduce hot spots. From block 716, the flow 700 continues with traditional chip design operations.

Figure 8:
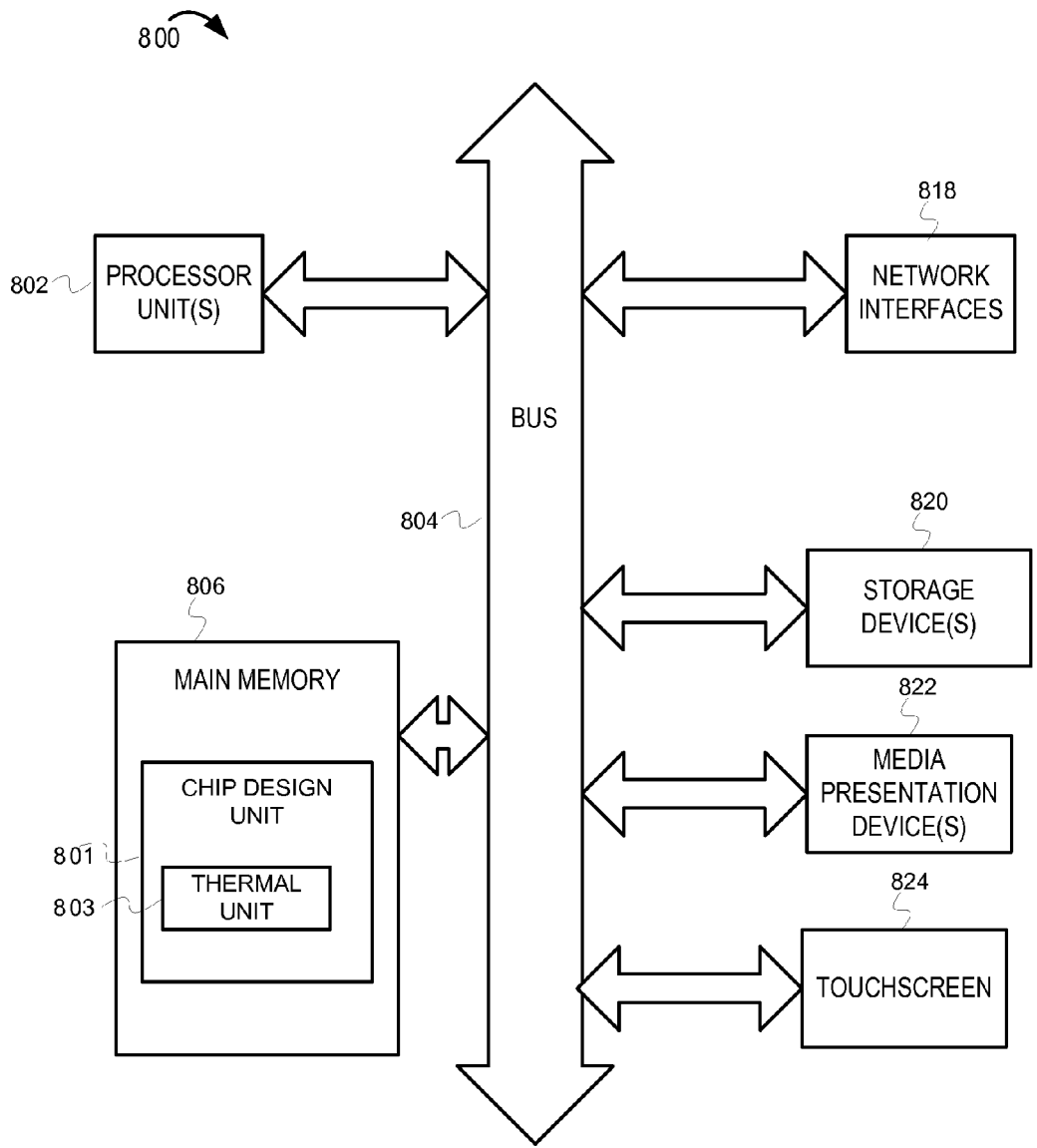
FIG. 8 is a bock diagram of an electronic computing device on which a circular user interface may be used, according to some embodiments of the inventive subject matter.

FIG. 8 is a bock diagram of an electronic computing device on which a circular user interface may be used, according to some embodiments of the inventive subject matter. The electronic computing device 800 includes a processor unit 802 (possibly including multiple processors, multiple cores, multiple nodes, and/or implementing multi-threading, etc.). The electronic computing device 800 includes memory 806. The memory 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic computing device 800 also includes a bus 804 (e.g., PCI, ISA, PCI-Express, HyperTransport®, InfiniBand®, NuBus, etc.), a network interface 818 (e.g., an ATM interface, an Ethernet interface, a Frame Relay interface, SONET interface, wireless interface, etc.), and a storage device(s) 820 (e.g., optical storage, magnetic storage, etc.). The system memory 806 embodies functionality to implement embodiments described above.

The system memory 806 includes a chip design unit 801, which includes a thermal unit 803. The chip design unit 801 can perform any of the operations and calculations described herein. For example, the chip design unit's thermal unit 803 can perform operations on the right side of the flow 600. Furthermore, the thermal unit 803 can determine $\Delta T$ Grid and use it as a parameter into the Guassian function described herein. Any one of these functionalities may be partially (or entirely) implemented in hardware and/or on the processing unit 802. For example, the functionality may be implemented with an application specific integrated circuit, in logic implemented in the processing unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, the storage device(s) 820, and the network interface 818 are coupled to the bus 804. Although illustrated as being coupled to the bus 804, the memory 806 may be coupled to the processor unit 802.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for identifying high-temperature regions in a microchip, the method comprising:
    selecting grids on the microchip, wherein each selected grid includes devices and interconnects connecting the devices;
    determining, for each selected grid using a processor, a temperature factor value based on geometric area of each selected grid, geometric area occupied by the devices, switching factor of the interconnects, and length of the interconnects connecting the devices; and
    determining, for each selected grid using the processor, thermal sensitivity for each selected grid by generating a plot based on a Gaussian equation.

2. The method of claim 1 further comprising:
    determining a thermal intensity is higher than a threshold;
    after determining the thermal intensity is higher than the threshold, reconfiguring the interconnects and devices in each selected grid.

3. The method of claim 2, where the temperature factor value and thermal intensity are determined based on chip design information before the chip is physically made.

4. The method of claim 1, wherein the Gaussian equation further includes a σ variable controlling height and spread of the plot, and wherein the σ variable is assigned the temperature factor, and wherein the Gaussian equation further includes a value μ variable, and wherein the method further comprises:
determining thermal sensitivity for two of the selected grids by combining plots of the two of the selected grids, wherein the combining the plots includes performing Gaussian addition of the σ and μ variables to create a composite σ value and a composite μ value.

5. The method of claim 4, wherein the μ variables for each of the two plots are constant.

6. The method of claim 4, further comprising:
generating another plot based on the Gaussian equations and the composite σ value.

7. The method of claim 1 further comprising:
dividing the microchip into the selected grids based on power leakage and dynamic power calculations.

8. A non-transitory machine-readable storage medium including instructions which when executed by a machine cause the machine to perform operations for identifying high-temperature regions in a microchip, the instructions comprising:
instructions to select grids on the microchip, wherein each selected grid includes devices and interconnects connecting the devices;
instructions to determine, for each selected grid, a temperature factor value based on geometric area of each selected grid, geometric area occupied by the devices, switching factor of the interconnects, and length of the interconnects connecting the devices; and
instruction to determine, for each selected grid, thermal sensitivity for each selected grid by generating a plot based on a Gaussian equation, wherein the Gaussian equation includes a σ variable controlling height and spread of the plot, and wherein the σ variable is assigned the temperature factor value.

9. The non-transitory machine-readable storage medium of claim 8 further comprising:
instructions to determine a thermal intensity is higher than a threshold;
instructions to, after determination the thermal intensity is higher than the threshold, reconfigure the interconnects and devices in each selected grid.

10. The non-transitory machine-readable storage medium of claim 9, wherein the temperature factor value and thermal intensity are determined based on chip design information before the chip is physically made.

11. The non-transitory machine-readable storage medium of claim 8, wherein the Gaussian equation further includes a μ variable, and wherein the instructions further comprise:
instructions to determine thermal sensitivity for two of the grids by combining plots of the two of the selected grids, wherein the combining the plots includes Gaussian addition of the σ and μ variables to create a composite σ value and a composite μ value.

12. The non-transitory machine-readable storage medium of claim 11, wherein the μ variables for each of the two plots are constant.

13. The non-transitory machine-readable storage medium of claim 12, wherein the instructions further comprise:
instructions to generate another plot based on the Gaussian equations and the composite σ value.

14. The non-transitory machine-readable storage medium of claim 8 further comprising:
instructions to divide the microchip into the selected grids based on power leakage and dynamic power calculations.

15. An apparatus comprising:
a processor;
a machine-readable storage device including instructions executable on the processor, the instructions to perform operations for identifying high-temperature regions in a microchip, the instructions comprising:
instructions to select grids on the microchip, wherein each selected grid includes devices and interconnects connecting the devices;
instructions to determine, for each selected grid, a temperature factor value based on geometric area of each selected grid, geometric area occupied by the devices, switching factor of the interconnects, and length of the interconnects connecting the devices; and
instruction to determine, for each selected grid, thermal sensitivity for each selected grid by generating a plot based on a Gaussian equation.

16. The apparatus of claim 15 further comprising:
instructions to determine a thermal intensity is higher than a threshold;
instructions to, after determination the thermal intensity is higher than the threshold, reconfigure the interconnects and devices in each selected grid.

17. The apparatus of claim 16, wherein the temperature factor value and thermal intensity are determined based on chip design information before the chip is physically made.

18. The apparatus of claim 15, wherein the Gaussian equation includes a σ variable controlling height and spread of the plot, and wherein the σ variable is assigned the temperature factor value, wherein the Gaussian equation further includes a μ variable, and wherein the instructions further comprise:
instructions to determine thermal sensitivity for two of the selected grids by combining plots of the two of the selected grids, wherein the combining the plots includes Gaussian addition of the σ and μ variables to create a composite σ value and a composite μ value.

19. The apparatus of claim 18, wherein the μ variables for each of the two plots are constant.

20. The apparatus of claim 18, further comprising:
instructions to generate another plot based on the Gaussian equations and the composite σ value.

* * * * *